United States Patent

[11] 3,625,746

[72] Inventors Yaichi Ayukawa
1168, Okamoto-cho, Setagaya-ku, Tokyo;
Seishi Shinya, Maebara-cho, Funabashi-shi; Teiko Kakegawa, Ohwada, Yachiyo-cho, both of Chibaken; Masako Ito, Jingumae, Shibuya-ku, Tokyo, all of Japan
[21] Appl. No. 856,175
[22] Filed Sept. 8, 1969
[45] Patented Dec. 7, 1971

[54] STARCH/POLYVINYL ALCOHOL/N-METHYLOL ACRYLAMIDE PAPER SURFACE COATING COMPOSITION
30 Claims, No Drawings

[52] U.S. Cl. .................................................. 117/93.31, 117/155 L, 117/161 LN, 260/17.3 R
[51] Int. Cl. .................................................. C08b 25/02, C08f 1/24, D21h 1/24
[50] Field of Search ............................................. 260/17.3, 17.2; 117/93.31, 155

[56] References Cited
UNITED STATES PATENTS
2,616,818 11/1952 Azorlosa ..................... 117/155
3,472,804 10/1969 Nobile et al. ................. 260/17.3

Primary Examiner—William M. Short
Assistant Examiner—Edward Woodberry
Attorneys—Joseph Shekleton, Janet E. Price, Robert D. Weist, Martha A. Michaels, Dorothy R. Thumler and Frank E. Robbins ABSTRACT: A paper coating comprising the reaction product of a starch material, polyvinyl alcohol and an N-methylol acrylamide, plus a clay.

STARCH/POLYVINYL ALCOHOL/N-METHYLOL ACRYLAMIDE PAPER SURFACE COATING COMPOSITION

This invention relates to an improved surface treatment of paper and, in particular, to the treatment of the surface of paper so as to improve its resistance to water. One of the advantages of the invention is that it utilizes a starch material as a substitute for casein, thus providing a more economical surface treatment of paper.

In the manufacturer of paper there are two broad classifications of sizing operations, i.e., internal sizing and surface sizing. As the name implies, internal sizing refers to the introduction of sizing materials on the interior of the paper. Often, the name is used jointly with loading as "internal sizing and loading." This form of sizing is accomplished by introducing the sizing or loading materials into the paper web at some point prior to or during its formation. Thus, the sizing and loading materials may be introduced into the furnish, into the white water line, or into the head box.

On the other hand, surface sizing, as this name implies, refers to application of the sizing materials to the surface of the sheet after it has been formed and dried. This ordinarily is accomplished most conveniently by means of rollers, i.e., a calendering process. As indicated above, the present invention deals with this form of sizing and a new sizing composition is provided for this type of paper treatment.

Aqueous pigment-starch coating compositions for paper are widely employed at the present time in the paper industry for the manufacture of glossy paper such as is generally used for magazines, catalogs, book jackets and the like, and for the manufacture of paperboard, insulating board, etc. The pigment generally is clay and the principal function of the starch is that of an adhesive for the pigment. The principal disadvantage of coated paper containing starch as the adhesive is that the paper possesses practically no wet-rub resistance and thus the appearance of such paper may be ruined beyond practical repair even by a few drops of water. Obviously, starch is not a desirable adhesive where water resistance is a problem.

Casein and isolated soya protein are the adhesives generally used where water resistance is required. The commercial availability of casein, however, is subject to wide variations in quality. Furthermore, coating compositions containing casein tend to be dilatant, i.e., they become very viscous under the conditions of pressure and shear which prevail when freshly coated paper is passed between smoothing rolls. This is an important limiting factor in the manufacture of sized paper because of degree of pressure and shear is increased with the rate of speed at which the processing equipment is run.

Except for its shortcomings noted above as an adhesive in the paper making art, starch has many advantages. It has good color and produces bright coatings of good printing quality. Furthermore, starch has less odor than proteinaceous adhesives such as casein, and starch also has less tendency to foam and to spoil than casein.

It is accordingly a principal object of this invention to provide a paper adhesive comprising a starch material.

It is another object of this invention to provide a paper adhesive having good water resistance.

It is another object of the present invention to provide an economical method of coating paper surfaces so as to impart water resistance thereto.

It is yet another object of the present invention to provide a method for precipitating a starch derivative on a paper surface.

These and other objects are accomplished by the process of preparing a polymeric material comprising mixing a starch material, polyvinyl alcohol and an N-methylol acrylamide in the presence of a free radical catalyst. The polymeric material thus prepared imparts to a paper surface highly desirable properties including resistance to moisture heretofore not realized with starch surface coatings. It may be applied as such to the paper surface or it may be prepared in situ on the paper surface.

A wide variety of starch materials may be used in the preparation of this polymeric material including not only starch itself, but also oxidized starch, dextrin, enzyme hydrolyzed starch, chlorinated starch, etc. Furthermore, starch from any source can be utilized, viz, corn, wheat, potato, tapioca, rice, sago and grain sorghum. As used herein, the term "starch material" is generic to all of these. Oxidized corn starch is especially useful because of its ready economic availability and its efficacy for the purpose of this invention. It should have a viscosity within the range of 1,000–70,000 centipoises as a 26 percent aqueous solution maintained at 150° F. for one hour and a viscosity within the range of 20,000–30,000 is particularly preferred. If the viscosity is too high it cannot be mixed suitably with the pigment component of the ultimate adhesive composition and if the viscosity is too low the adhesive composition is not sufficiently adhesive. Oxidized starch is best prepared by treatment of starch with an amount of alkali metal hypochlorite, such as to provide 0.9–1.3 percent halogen as chlorine (based on the starch) at 100°–120° F.

The polyvinyl alcohol should have a molecular weight within the range of from about 20,000 to about 100,000 and a D.P. (degree of polymerization) within the range of from about 500 to about 2,500, preferably from about 1,000 to about 2,000. It may be only partially hydrolyzed (polyvinyl acetate), but preferably should be fully hydrolyzed. A number of polyvinyl alcohols are commercially available within these ranges.

An important advantage of the present invention is that it permits the use of a relatively large portion of starch, with respect to the amount of polyvinyl alcohol, thus permitting the realization of large economies because of the relatively low cost of the starch. As much as 10 parts of starch and more, per part of polyvinyl alcohol, can be used with good results, i.e., a coated paper surface having satisfactory wet-rub resistance. At the other end of the scale, it is contemplated that equal portions by weight of starch and polyvinyl alcohol may be employed, although lesser amounts of starch may also be used in some particular instances. The amount of N-methylol acrylamide used will affect the desired amount of polyvinyl alcohol, a large amount of N-methylol acrylamide dictating a correspondingly small amount of polyvinyl alcohol. In general, the amount of N-methylol acrylamide should range from between about 5 to about 30 percent of the total amount of starch and polyvinyl alcohol, preferably between from about 10 to about 20 percent.

The free radical catalyst employed should be soluble in water or in a single-phase solution containing at least 20 percent of water, such as mixtures of water with an alcohol, e.g., methanol or ethanol, or with a ketone such as acetone. The desired water solubility of the catalyst permits it to be an effective polymerization initiator in an aqueous medium. Preferred examples include ammonium persulfate and the alkali metal persulfates. These catalysts also are acidic and as such serve not only to polymerize the olefinic double bond of the N-methylol acrylamide, but also to cause the methylol group thereof to react both with the cellulosic hydroxyl groups on the surface of the cellulose matrix and with the hydroxyl groups of the polyvinyl alcohol and of the starch. This latter reaction requires an acidic environment and the use of the above catalysts accordingly is quite advantageous since they do not require the use of an additional acidic material although, if desired, small amounts of additional acidic material may be included in order to assure the simultaneous vinyl polymerization and etherification reactions.

Alternatively, a neutral free radical catalyst such as azodiisobutyronitrile may be employed, although it is water insoluble and must therefore be used as a solution in an organic solvent which is miscible with water. In such instances, an acidic material should be added later so that, in effect, the olefinic double bonds are first polymerized by the neutral catalyst, and then the methylol groups are condensed with the hydroxyl groups of the cellulose, starch and/or polyvinyl alcohol. Suitable acidic materials include sodium bisulfate, ammonium chloride, oxalic acid, lactic acid, acetic acid, etc. Ordinarily, the catalyst will be used as a dilute aqueous solution, i.e., 1 percent, and the total amount of such catalyst should be at least about 0.3 percent by weight based on the total weight of the polymerization mixture, and generally about 1 percent.

The process involves initially blending the starch and polyvinyl alcohol. This generally is accomplished by slurrying the starch in water with an aqueous solution of the polyvinyl alcohol and heating the slurry to cause it to gel. Another method of accomplishing this blending is to utilize a hydrolytic enzyme such as alpha-amylase which degrades the starch and thus permits the formation of a more miscible mixture in a shorter time. The enzymatic activity must be controlled by the use of an appropriate amount of enzyme and also by adding a deactivating material such as formaldehyde to terminate it at the desired stage. When formaldehyde is used for such purposes it serves the additional purpose of reacting with an acrylamide to form the corresponding N-methylol acrylamide, as described later herein.

The N-methylol acrylamide may be unsubstituted, i.e.,

$CH_2$ $CHCONHCH_2OH$ or the single hydrogen attached to the second carbon may be substituted by methyl, chloro, etc. In general, however, the unsubstituted N-methylol acrylamide is preferred for reasons of its relative effectiveness. It is available in the market and may be used as such, or it may be prepared in situ, merely by mixing stoichiometric quantities of acrylamide and formaldehyde in an alkaline medium and heating at about 100° C. for a short time. Such a product mixture contains about 80 percent of the desired N-methylol acrylamide and may be used as such. Where, as indicated above, formaldehyde is employed to terminate the activity of the enzyme used to facilitate the blending of starch and polyvinyl alcohol, such formaldehyde may be used in an appropriate quantity to accommodate the later in situ preparation of N-methylol acrylamide.

The temperature of the process mixture, i.e., containing starch, polyvinyl alcohol and N-methylol acrylamide, may range from room temperature up to about 100° C., but in most instances 50°–60° C. is a suitable reaction temperature.

An important constituent of a paper adhesive composition is a pigment which may be any of various clays, titanium dioxide, zinc sulfide, calcium carbonate and the like. Types of clays contemplated herein include kaolinite, Geeklite AT, English clay, etc. The proportion of clay, with respect to the total amount of solids in the overall adhesive composition, will vary within the range of from about 45 percent to about 65 percent. The pigment fills the many minute interstices of the formed paper web and thus serves to strengthen the paper as well as to give it its color. The pigment may be incorporated into the process mixture prior to the actual reaction of the process, i.e., it may be present during the reaction, or it may be added after the reaction has been terminated. It appears to have no deleterious effect upon the course of the reaction.

The adhesive composition formulated as indicated herein may be applied to a paper surface by any of the ordinarily employed devices available for this purpose, i.e., air knife, roll coater, etc.

As mentioned earlier, an alternative method of preparing the adhesive composition of this invention is to mix all of the ingredients, including the clay, but excluding the free radical catalyst, apply the resulting mixture to the paper surface and then add the free radical catalyst so as to form the adhesive composition in situ on the paper surface. In this variant of the process, the free radical catalyst is desirably sprayed onto the coated paper surface. The coated paper surface, in this instance, is desirably exposed to irradiation from a high-voltage electron accelerator prior to application of the free radical catalyst. The degree of irradiation is slight, of the order of 0.1 to 1.0 megarad, and is accomplished most conveniently by exposure of the paper surface while it is on a moving belt.

Irradiation in this variant of the process results in a paper surface having a considerably improved water resistance.

In still another variant of the process the free radical catalyst is added to the process mixture, containing pigment prior to coating on the paper surface, then the coated paper surface is irradiated, and finally the irradiated surface is cured by heating at 150° C. for 2 minutes. Again, the irradiation is effective to provide a paper surface of much improved water-resistant properties.

The final step in each case is a curing operation involving heating at a temperature within the range of from about 100 to about 200° C., preferably from about 125° to about 175° C. In some instances, this curing step is divided into two operations: heating at about 150° C. for 90 seconds and then heating with a hot iron at the same temperature for 30 seconds.

The invention is illustrated in more detail in the following examples wherein all parts are by weight unless otherwise stated.

EXAMPLE I

A mixture of 40 parts of oxidized starch containing 12 percent moisture, 195 parts of water and 100 parts of 15 percent aqueous polyvinyl alcohol is heated at 80° C. for 30 minutes to form a gelatinous paste. To this is added 12 parts of a freshly prepared 5 percent aqueous solution of potassium persulfate and 8 parts of an N-methylol acrylamide. The resulting mixture then is heated at 60° C. for 2 hours and added to a clay slip containing 450 parts of Geeklite AT clay and 0.9 part of sodium hexametaphosphate, together with a quantity of water sufficient to bring the total solids content to 45 percent. This mixture was agitated at 60° C. for 2 hours, the pH being adjusted throughout to 4.5. Analysis of the product mixture shows the following:

| | |
|---|---|
| Brookfield viscometer reading at 20 r.p.m. | 8,550 cp. |
| Stability index (viscosity after 24 hours/initial viscosity) | 1.1 |

The above adhesive composition was applied to a paper surface by means of a number 8 Mayer rod. The coated surface was air dried at room temperature then cured by heating in an oven at 150° C. for 90 seconds and then with a hand iron at the same temperature for 30 seconds. The resulting paper coating was shown to have a high degree of wet-rub resistance by the TAPPI (Technical Association of the Pulp and Paper Industry) Test designed to show this property. That test consists of employing a wet rubber block to scrub a test surface (a coated paper) 20 times. The test surface and rubber block then are washed with water and the washings collected in a flask. The water in the flask is diluted to 100 milliliters total volume and the transmittance of the resulting solution is determined at 4,250 Angstroms in a 60 milliliter cell using a Fisher electrophotometer II. A reading of 100 percent transmittance indicates that the wet-rub resistance of the test surface is so great that none of the coating has been rubbed off by the rubber block. The test surface in this instance showed a wet-rub resistance of 87.3 percent.

A sample of the coated paper, prior to the curing step, was sprayed with an 0.2 percent aqueous potassium persulfate solution, then dried at room temperature, then cured. The wet-rub resistance of this sample was 91.2 percent.

Paper coated with a mixture of the same proportions of oxidized starch, polyvinyl alcohol and Geeklite clay had no wet-rub resistance whatsoever.

EXAMPLE II

To a mixture of the same proportions of oxidized starch, polyvinyl alcohol and water as used in the above example there were added 7.8 parts of formalin and 6 parts of acrylamide. The pH of the resulting mixture was adjusted to 10 by the addition of 0.7 part of 10 percent aqueous sodium hydroxide and then stirred vigorously at 80° C. for 4 hours, the pH being maintained at 10 throughout this period. The mixture then was treated with 12 parts of 5 percent aqueous potassium persulfate and maintained at a temperature of 60° C. for 2 hours with mild agitation. Geeklite clay then was incorporated into the composition as in example I and the resulting adhesive coated onto paper also as in example I. The coated paper surface showed a wet-rub resistance of 91 percent.

EXAMPLE III

A mixture of 40 parts of granular corn starch containing 12 percent moisture, 100 parts of 15 percent aqueous polyvinyl alcohol and 194 parts of water was heated at 80° C. for 30 minutes. To the resulting gelatinous mixture there was added 7.2 parts of 0.1 N calcium chloride solution and 7 parts of 0.1 percent kleistase, an enzyme product of bacterial amylase having a strength of 10,000 AU/g. This mixture was heated at 80° C. for 1 hour whereupon 5 parts of 0.1 Mole cupric sulfate solution was added to terminate the enzyme activity. To this there was added 8 parts of N-methylol acrylamide and 12 parts of 5 percent aqueous potassium persulfate. The resulting mixture was heated at 60° C. for 2 hours with stirring. Preparation of an adhesive composition containing clay was carried out as in example I and this adhesive was coated on a paper surface. The paper surface was found to have a wet-rub resistance of 92.5 percent.

EXAMPLE IV

A mixture of 40 parts of granular corn starch containing 12 percent moisture, 100 parts of 15 percent aqueous polyvinyl alcohol and 194 parts of water was heated at 80° C. for 30 minutes. To this mixture there then was added 7.2 parts of 0.1 N aqueous calcium chloride and 7 parts of 0.1 percent kleistase, then 3 parts of formalin, 6 parts of acrylamide and 12 parts of 5 percent aqueous potassium persulfate. The resulting mixture was heated at 60° C. for 2 hours with stirring, then mixed with 450 parts of Geeklite AT clay, 0.9 part of sodium hexametaphosphate and sufficient water to give an adhesive composition having 42 percent solids. The resulting adhesive composition was coated on paper as in example I. The coated paper surface was found to have a wet-rub resistance of 93.7 percent.

EXAMPLE V

An adhesive composition was prepared as in example IV except that the amount of amylase enzyme ("kleistase") used was twice as much as that used in example IV. This adhesive composition was coated on paper and the coated paper found to have a wet-rub resistance of 60.2 percent.

The procedure of this example was repeated except that, prior to the curing step, the coated paper was sprayed with 0.2 percent aqueous potassium sulfate and then dried at room temperature. In this case, the finally coated paper surface was found to have a wet-rub resistance of 90.2 percent.

EXAMPLE VI

N-methylol acrylamide was prepared by mixing 35.6 parts (0.5 mol) of acrylamide, 43 grams of formalin (0.53 mol) and 50 ml. of water and adjusting the pH to 10.4 by means of 2 percent aqueous sodium hydroxide. The resulting mixture was heated at 100° C. for 5 hours, the pH of the reaction mixture being adjusted at the end of this period (from 6.5) to 10 and the reaction continued for another 2 hours. The resulting product mixture had a pH of 6.9 and upon analysis was found to contain about 80 percent of N-methylol acrylamide. Nevertheless, it was suitable for use in the process of this invention, as illustrated more specifically hereinafter.

A mixture of 60 parts of a 30 percent aqueous paste of oxidized starch and 36 parts of a 15 percent aqueous paste of polyvinyl alcohol was added to a clay slip containing 202 parts of Georgia Kaolin clay and 4 parts of 10 percent aqueous sodium hexametaphosphate. Water was added to decrease the overall solids content to 60 percent and the resulting mixture then treated with 26 parts of 1 percent aqueous potassium persulfate and 17.3 parts of a 15 percent aqueous solution of N-methylol acrylamide prepared as above. The resulting adhesive composition was neutralized with dilute ammonium hydroxide and kept at 60° C. for 4 hours. Then it was applied to a paper surface as in example I and the resulting coated paper surface found to have a wet-rub resistance of 91.0 percent.

EXAMPLE VII

An adhesive composition was prepared as in example VI except that the relative proportions of oxidized starch and polyvinyl alcohol were in the ratio of 9:1. The wet-rub resistance of the resulting coated paper surface was found to be 92.2 percent.

EXAMPLE VIII

A mixture of 53 parts of a 30 percent aqueous paste of oxidized starch, 32 parts of a 15 percent aqueous paste of polyvinyl alcohol and a clay slip containing 202 parts of Georgia Kaolin clay, and 4 parts of 10 percent aqueous sodium hexametaphosphate was diluted with water so as to reduce the overall solids content to 60 percent. To this mixture there was added 35 parts of a 15 percent aqueous solution of N-methylol acrylamide prepared as in example VI and the resulting mixture immediately coated onto a The surface. The coated surface then was irradiated by means of a high-voltage electronic accelerator, the total irradiation amounting to 0.5 megarad. The irradiated surfaces then were sprayed with 0.2 percent aqueous potassium persulfate, air dried at room temperature, then cured by heating at 150° C. for 2 minutes. The coated paper surface showed a wet-rub resistance of 89.4 percent. Repetition of this process, omitting the irradiation step, resulted in a coated paper surface showing a wet-rub resistance of 53.7 percent.

EXAMPLE IX

An adhesive composition was prepared as in example VIII except that 26 parts of the 1 percent aqueous potassium persulfate was employed (instead of spraying the coated paper surface with 0.2 percent aqueous potassium persulfate). Also, the extent of irradiation was 0.2 megarad rather than 0.5 megarad as in example VIII. Otherwise, the process was identical. The coated paper surface resulting from this variant showed a wet-rub resistance of 93.2 percent. The effectiveness of the irradiation step was demonstrated by repeating this variant, omitting the irradiation step; in such instance the wet-rub resistance of the coated paper surface was 51.0 percent.

EXAMPLE X

An adhesive composition was prepared as in example VI, using Georgia Kaolin for the Geeklite AT clay and the pH of the mixture was adjusted to 4.5 Immediately after applying the adhesive composition to the paper surface, the paper surfaces were sprayed with 1 percent aqueous potassium persulfate and then cured by heating at 150° C. for 2 minutes. The coated paper surface showed a wet-rub resistance of 86.5 percent. Repetition of this process, curing at 120° C. for 10 minutes instead of at 150° C. for 2 minutes, resulted in a coated paper surface showing a wet-rub resistance of 83.3 percent.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for preparing a polymeric material comprising mixing, in an aqueous medium at from room temperature to about 100° C., from about 1 to about 10 parts of a starch material having a viscosity within the range of 1,000–70,000 centipoises as a 26 percent aqueous solution maintained at 150° F. for 1 hour, with one part of a polyvinyl alcohol having a molecular weight of from about 20,000 to about 100,000 and from about 5 percent to about 30 percent, based on combined starch material and polyvinyl alcohol of an N-methylol acrylamide, in the presence of a free radical catalyst.

2. The process of claim 1 wherein the starch material is corn starch.

3. The process of claim 1 wherein the starch material is potato starch.

4. The process of claim 1 wherein the starch material is an oxidized starch.

5. The process of claim 1 wherein the starch material is an oxidized corn starch.

6. The process of claim 1 wherein the starch material is a hydrolyzed starch.

7. The process of claim 1 wherein the starch material is an oxidized starch having a viscosity of 20,000–30,000 centipoises as a 26 percent aqueous solution maintained at 150° F. for 1 hour.

8. The process of claim 1 wherein the starch material is dextrin.

9. The process of claim 1 wherein the starch material is an enzyme hydrolyzed starch.

10. The process of claim 1 wherein the polyvinyl alcohol has a D.P. of 1,000–2,000.

11. The process of claim 1 wherein the polyvinyl alcohol is fully hydrolyzed.

12. The process of claim 1 wherein the N-methylol acrylamide is prepared in situ.

13. The process of claim 1 wherein the N-methylol acrylamide is prepared in situ by the reaction of approximately equal molar quantities of formaldehyde and acrylamide in an alkaline medium.

14. The product of the process of claim 1.

15. The process of claim 1 wherein the free radical catalyst is water-soluble.

16. The process of claim 1 wherein the free radical catalyst is an alkali metal persulfate or ammonium persulfate.

17. The process of claim 1 wherein the free radical catalyst is potassium persulfate.

18. A composition of matter comprising a product prepared by the process of claim 1 and a pigment.

19. The composition of claim 18 wherein the pigment is clay.

20. The composition of claim 18 wherein the pigment is titanium dioxide.

21. The composition of claim 18 wherein the pigment is Georgia kaolin.

22. The process of preparing a polymeric material comprising mixing in an aqueous medium at from room temperature to about 100° C. from about 1 to about 10 parts of starch with one part of a polyvinyl alcohol having a molecular weight of from about 20,000 to about 100,000, and a hydrolytic enzyme to cause hydrolysis of the starch, adding stoichiometric quantities of acrylamide and formaldehyde to form from about 5 to about 30 percent, based on combined starch and polyvinyl alcohol, of N-methylol acrylamide, adding a free radical catalyst to the N-methylol acrylamide containing mixture and heating said mixture to cause polymerization.

23. The process of claim 22 wherein the free radical catalyst is an alkali metal persulfate.

24. A paper coating composition comprising a pigment, from about 1 to about 10 parts of a starch material, having a viscosity of from 1,000 to 70,000 centipoises as a 26 percent aqueous solution maintained at 150° F. for 1 hour, one part of a polyvinyl alcohol having a molecular weight of from about 20,000 to about to about 100,000 and from about 5 to about 30 percent, based on combined starch material and polyvinyl alcohol, of an N-methylol acrylamide.

25. The paper coating composition of claim 24 wherein the starch material is an oxidized starch having a viscosity of from 20,000 to 30,000 centipoises as a 26 percent aqueous solution maintained at 150° F. for 1 hour.

26. A paper having a coating thereon formed from the composition of claim 24.

27. The method of sizing paper comprising applying thereto a composition prepared by the process of claim 1 to the surface of said paper, then curing the coated surface by heating.

28. The method of claim 27 wherein the curing step comprises heating at a temperature within the range of from about 100° C. to about 200° C.

29. The method of claim 27 wherein the coated paper surface is irradiated by means of a high-voltage electronic accelerator prior to the curing step.

30. The method of claim 27 wherein the coated paper surface is sprayed with an aqueous alkali metal or ammonium persulfate prior to the curing step.

* * * * *